(No Model.) 6 Sheets—Sheet 1.

C. H. COOLEY.
GRAIN WEIGHER.

No. 442,722. Patented Dec. 16, 1890.

Witnesses:
W. M. Bjorkman
Henry L. Reckard

Inventor:
C. H. Cooley
By his Attorney
F. H. Richards (No Model.) 6 Sheets—Sheet 2.

C. H. COOLEY.
GRAIN WEIGHER.

No. 442,722. Patented Dec. 16, 1890.

Witnesses:
W. M. Brockman
Henry L. Reckard

Inventor:
C. H. Cooley,
By his Attorney,
F. H. Richards (No Model.) 6 Sheets—Sheet 3.
C. H. COOLEY.
GRAIN WEIGHER.
No. 442,722. Patented Dec. 16, 1890.
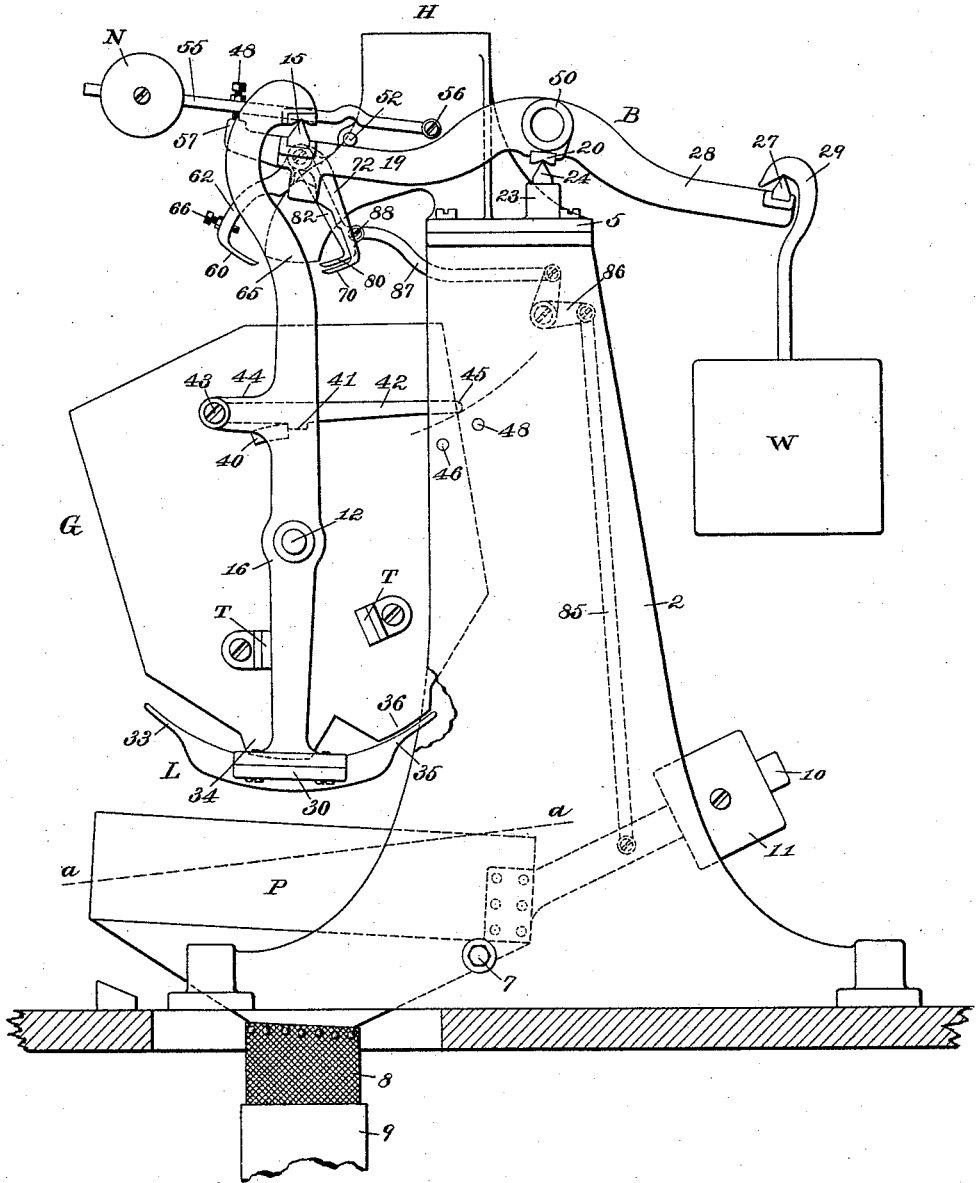
Witnesses: Inventor:
C. H. Cooley,
By his Attorney, (No Model.) 6 Sheets—Sheet 4.
C. H. COOLEY.
GRAIN WEIGHER.
No. 442,722. Patented Dec. 16, 1890.
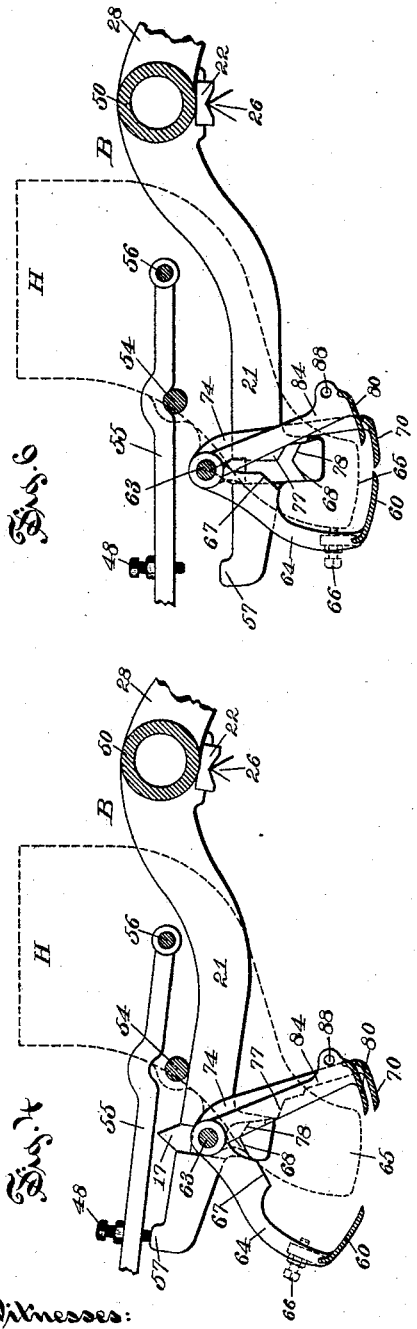
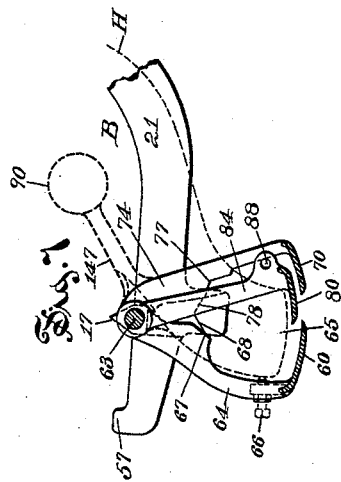
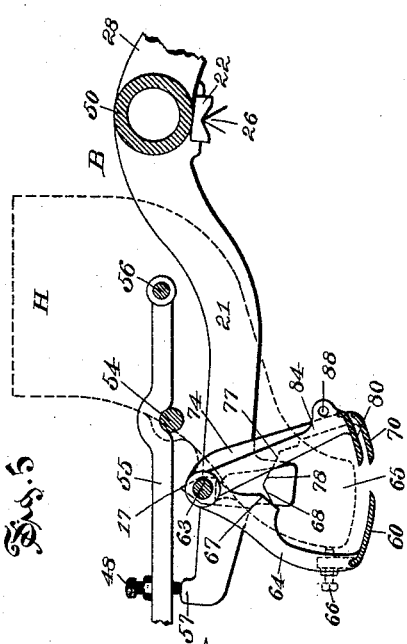
Witnesses:
WM. Bjorkman.
Henry L. Reckard.
Inventor:
C. H. Cooley,
By his Attorney
F. H. Richards (No Model.) 6 Sheets—Sheet 5.
C. H. COOLEY.
GRAIN WEIGHER.
No. 442,722. Patented Dec. 16, 1890.
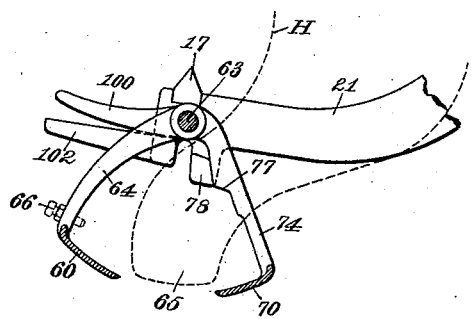
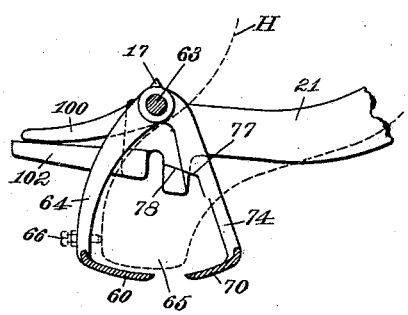
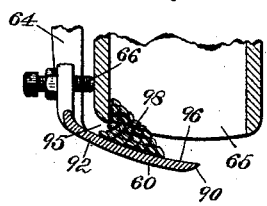
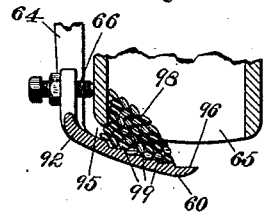
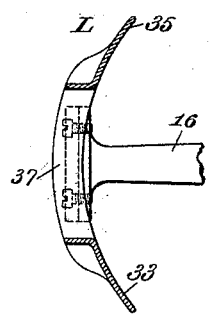
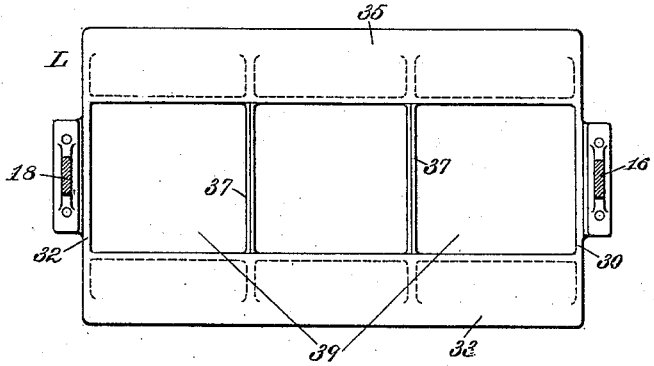

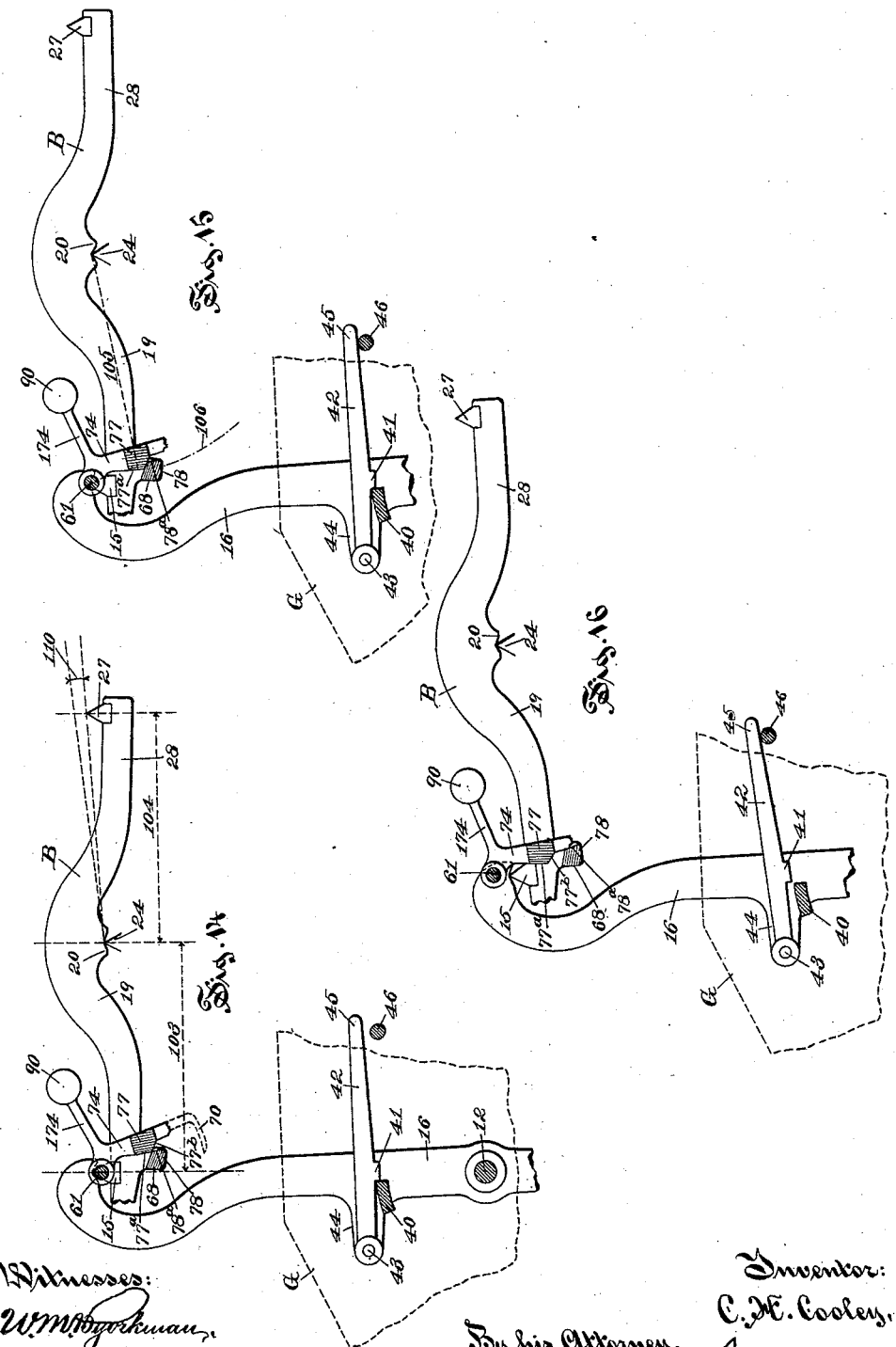

UNITED STATES PATENT OFFICE.

CHARLES H. COOLEY, OF HARTFORD, CONNECTICUT, ASSIGNOR TO THE PRATT & WHITNEY COMPANY, OF SAME PLACE.

GRAIN-WEIGHER.

SPECIFICATION forming part of Letters Patent No. 442,722, dated December 16, 1890.

Application filed January 30, 1890. Serial No. 338,544. (No model.)

*To all whom it may concern:*

Be it known that I, CHARLES H. COOLEY, a citizen of the United States, residing at Hartford, in the county of Hartford and State of Connecticut, have invented certain new and useful Improvements in Grain-Weighers, of which the following is a specification.

This invention relates to automatic grain-scales or grain-weighers operated by the power or weight of the descending grain.

My invention has for its object the production of an accurate and efficient grain-scale adapted to be operated continuously for considerable periods of time without appreciable error or variation.

Figure 1:
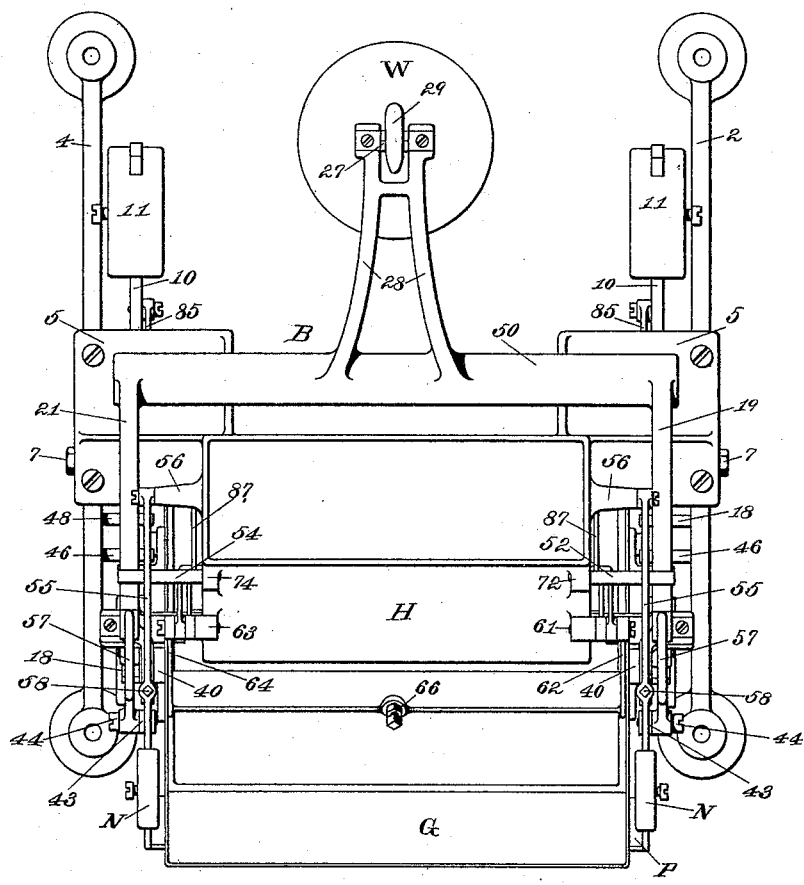
Figure 2:
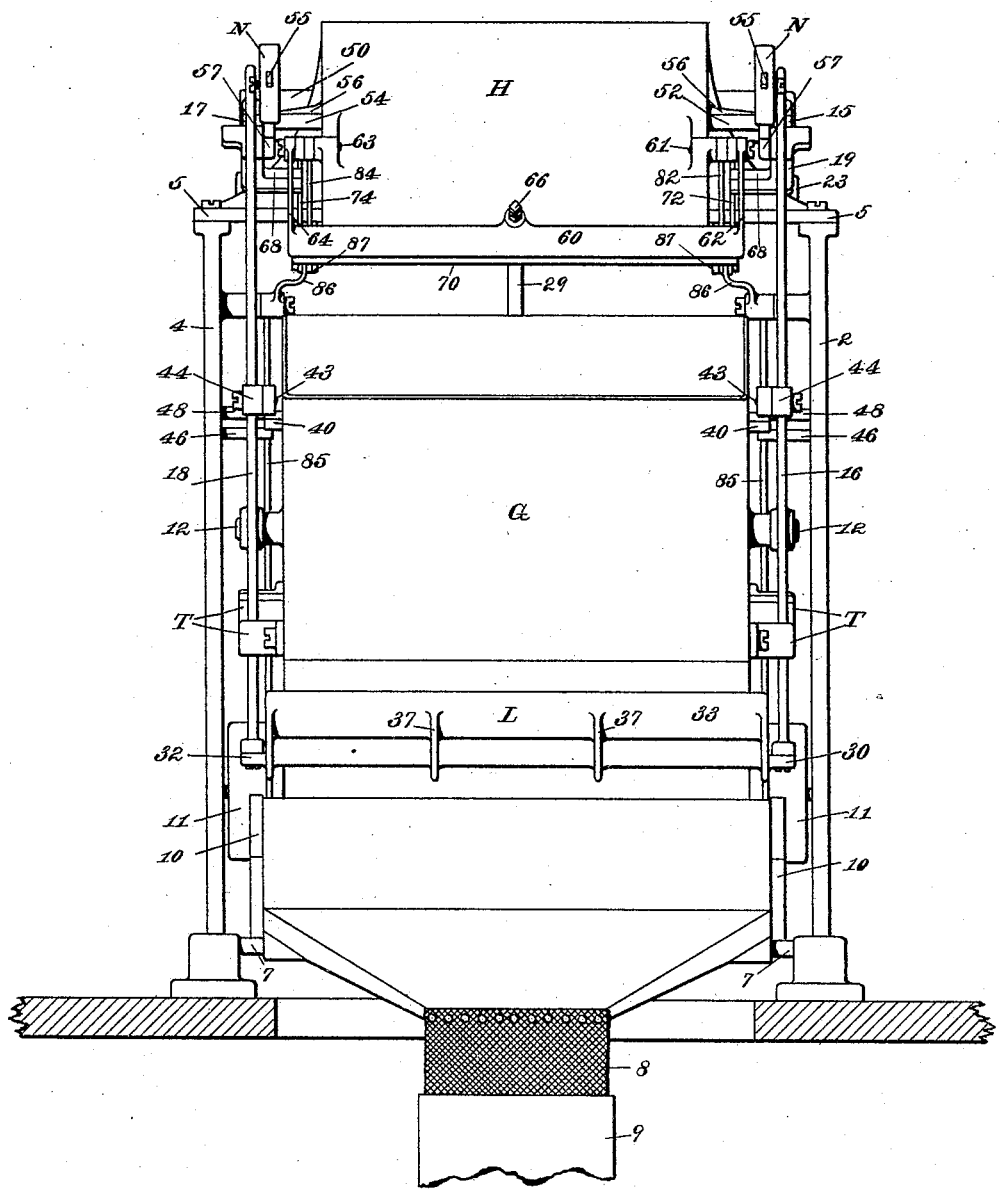

In the drawings accompanying and forming a part of this specification, Figure 1 is a plan view of an automatic grain-scale embodying my improvements. Fig. 2 is a front elevation of the machine. Fig. 3 is an elevation of one side of the machine, which side is at the right hand in Fig. 2. Figs. 4, 5, 6, and 7 are detail views similar to a portion of Fig. 3, showing successive stages of the operation of the reducing, cut-off, and regulator valves. Figs. 8 and 9 illustrate one modified arrangement of the valve-operating devices. Figs. 10 and 11 show in two forms an improvement in the said valves. Fig. 12 is a plan, and Fig. 13 a cross-section, of the bottom plate for the grain-bucket. Figs. 14, 15, and 16 show more fully and accurately certain features of my improvements relating to the scale-beam and some of the combinations therewith. These views especially illustrate the operation of the devices for bearing down the beam to cause the discharge of the load of grain.

Similar characters designate like parts in all the figures.

The frame-work for carrying the operative parts of the machine usually and as shown in the drawings comprises two side frames or uprights 2 and 4, held together by ordinary tie-rods or braces, (not shown,) and a top plate 5, to which is attached the supply-chute H.

The grain-bucket G, of the double-chambered kind used in the well-known "Hill" grain-scale, is suspended under the chute H, and discharges its load of grain into the regulator-hopper P, which is pivoted at 7 to the frame-work or which is otherwise suitably supported below said grain-bucket. The regulator P has the usual continuously-open outlet in the bottom thereof, and is or may be connected by the flexible pipe 8 to deliver the grain into the fixed conduit 9. Said regulator has one or more arms or levers 10 10, carrying the counterbalancing-weights 11 11, and suitable stops (not shown) are in practice provided for properly limiting the rising and falling movements thereof. In Fig. 3 the regulator or hopper is shown in its highest position, as when empty or nearly empty of grain. When full or nearly full of grain, it is carried down, as indicated by the dotted line $a\ a$ in Fig. 3. This furnishes the means and power for actuating the regulator-valve, as hereinafter set forth.

The mode shown in the drawings of counterweighting said regulator-hopper is not of my sole invention, but is described and claimed in a separate application filed jointly by myself and F. H. Richards, Serial No. 340,284, February 13, 1890.

The grain-bucket G is journaled at 12 in bearings formed in the hangers 16 and 18, which are suspended by V-shaped bearings on the pivots or knife-edges 15 and 17, respectively, of the principal arms 19 21 of the scale-beam B. This beam has V-shaped bearings 20 22, one at each end thereof, which rest on the pivots or knife-edges 24 26, that are suitably supported, as by bearings 23 25, on the frame-work. Opposite to arms 19 21 an arm 28 extends, and is provided with a pivot or knife-edge 27, on which the main weight W (also designated as the "counterweight") is suspended by hook 29. The oscillation of the bucket G within said hangers is limited by suitable stops, one well-known kind of which is shown at T in Fig. 3 and in prior Letters Patent. Extending to the bottom of the bucket the hangers 16 and 18 are there attached to ends 30 32, respectively, of the bottom plate L, whose sides 33 35 form valves or "closers" for the discharge-chutes 34 36, respectively, of the grain-bucket. The upper surface of the plate or closer-frame L is or may be set substantially concentric to the axis of the journal 12, and the two sides 33 35 of the frame are or may be connected at intervals by vertical ribs or cross-bars 37.

This mode of construction produces a superior structure, having all the necessary qualities, and in which the hangers are each a single bar. When the grain-bucket swings first to one side and then to the other side, as set forth in said prior patent, the discharge-chutes 34 36 alternately come over the openings 39, Fig. 12, through which the grain passes down to the hopper P.

For locking the bucket in its respective positions and for unlocking the same at the proper times I employ devices which are an improvement on those described for said purpose in the said prior Letters Patent. In practice I use two of these devices, located one on each side of the bucket; but I will describe one only. A catch 40 is fixed on the bucket and is fitted to engage with the detent-catch 41 on the latch 42, which latch is pivoted by one end at 43 to the arm 44 of the hanger or suspender 16. The opposite end 45 of said latch or lever 42 extends back and immediately above one of the stops or abutments 46 or 48. When the bucket (loaded in the rear chamber) and hangers stand toward the left hand, as in Fig. 3, the end 45 is over the abutment 46, and when the bucket is carried down by its completed load said abutment stops the end 45, and thus serves to disengage the catch 41 of said latch from the catch 40. When the positions of the said parts are reversed, (the bucket being loaded in the opposite chamber,) the end 45 stands over abutment 48, which then similarly acts to disengage the said catches on the descent of the bucket. By the use of this arrangement I am enabled to use a lever 42, extended far beyond the catch 41, so that a powerful leverage is obtained for disengaging the same, thus reducing the resistance to the downward movement of the bucket and increasing the efficiency and accuracy of the machine. However, so far as concerns the combinations hereinafter claimed, and in which the beam-actuating device is included, any well-known form or kind of bucket-latches may be used instead of the improved one herein set forth.

The scale-beam B is shown formed in a single piece, which comprises the arms before mentioned, the shaft 50, and the several knife-edges and V-shaped bearings. The shaft 50 may be formed hollow to secure greater strength and rigidity with a given weight, and is located above the axis of oscillation of the beam, which axis of course coincides with the knife-edges 24 and 26. The bearings 20 and 22 are secured to (or formed on) the under side of shaft 50, and the knife-edges 15, 17, and 27 to the upper side of the said arms, respectively, those arms being shaped or curved downwardly to bring the edges 15 and 27 substantially in a plane through the edges 24 and 26, they being usually slightly below.

When reference is herein made to the movement of the scale-beam, the movement of the bucket-supporting arms thereof is meant, this coinciding of course with the bucket itself.

The movement of the beam B is or may be limited in its upward movement by some suitable stops, as 52 54, and is naturally stopped in its downward movement by the discharge of the grain immediately following the tripping of catch 41 by stop 46 or 48. A special stop (not shown) may be and sometimes is provided for the latter purpose.

The main weight W in my present machine I make to fully balance the weight of the loaded bucket, thus dispensing with the supplemental weight usually employed in this class of grain-weighers to counterbalance the completed load; but in order to retain the same mode of making up that load by a reduced flow of grain I employ a smaller resistance or balance weight N, whose weight is opposed to that of the main weight prior to the beginning of the "drip" of the column of grain. This weight N is carried on a lever 55, pivoted at 56 to some part of the frame-work and whose downward movement is limited by some fixed stop. As shown in the drawings, the stop 52 (or 54) serves this purpose. The main beam B has a part, as 57, which strikes said lever 55 or some part thereof, (as the adjusting-screw 48,) and thus lifts weight N, as in Fig. 3, when the bucket G is raised. When the bucket is gradually filled, as in practice, it first goes down until the lever 55 rests on stop 52, having then received a weight of grain equal to the difference between the effective weights of the weights W and N. Next it stands in this mid-stroke position until the load fully equals the effective weights of the weight W, when it descends and discharges its load, as hereinbefore set forth.

The valve mechanism for reducing and for cutting off the flow of grain to the bucket is actuated from and by the scale-beam. The reducing-valve 60 is carried by arms 62 64, which are suspended from pivots 61 63, respectively. This valve closes under the outlet 65 of the chute H, somewhat more than half the width thereof, and is limited in said movement by an adjustable stop 66. The operation of this valve and of the means for actuating the same will be best understood from Figs. 4 to 7, inclusive.

The arm 64 has a cam-shaped part at 67, which is acted on by the cam or valve-actuator 68, that is fixed to the arm 21 of the main beam. When this beam is down, as in Figs. 5 and 6, the valve is closed; but when it rises, as in Fig. 4, the said actuator 68 forces out the arm 64 and opens the valve, as there shown. The working-faces of said parts 67 and 68 are so inclined to the line of movement of the actuator 68 that the upward movement of the beam is not materially obstructed by the moderate force required to work the valve. The proper inclination of said faces is readily determined in any particular case experimentally. The cut-off valve 70 is similarly suspended by arms 72 74 from the said pivots 61 63 or from some point near thereto. The arm 74 has a cam-shaped part 77, which is acted on by the cam or valve-actuator 78, that is fixed to the beam B. When this beam is down, as in Fig. 6, the valve 70 is closed and (the valve 60 being also closed, as shown) cuts off the flow of grain; but when the beam rises, as in Fig. 4, the actuator 78 strikes cam 77 and forces back arm 74, thus opening the valve 70. Thus the rising of the beam opens both valves, as in Fig. 4, and leaves the flow of grain unobstructed. The two valves 60 and 70 being located on opposite sides of the chute, the necessary stroke of each valve is reduced to minimum and to such a small distance as to make practicable the use of the direct-acting actuators described for operating said valves. Heretofore in this class of two-valve grain-scales it has been customary to employ a long-stroke cut-off valve, whose movement extended clear across the outlet 65. By my improvements that necessity is obviated and a more simple and effective mechanism is obtained. In practice the two cams or valve-actuators 68 and 78 may be made in a single piece, as shown, it being fitted to act on each valve-arm independently of the other arm; but in any case said actuators are independent elements and of no necessary connection with each other.

The arm 74 of the cut-off valve serves two separate purposes, especially in its weighted form (shown in Fig. 14)—to wit, first, as a valve-arm, and, second, as a beam-actuating arm for transferring its own effect and the effect of the weight 90 onto the beam at the completion of the poising. To illustrate this latter feature, I have prepared the diagrammatic views, Figs. 14, 15, and 16, in which the weight-actuated arm 174 represents the upper part of the valve-arm 74, (shown in the preceding figures,) and in which is more clearly shown the overpoise-beam and the mode of operation of said beam in connection with the valve mechanism and with the grain-bucket mechanism.

By the term "overpoise-beam" I mean a scale-beam having its supporting-pivots or knife-edges 24 and 26 below the plane of the aforesaid pivots from which the bucket and the counter-weight are suspended. With this type of beam the poising is completed, theoretically, and ignoring the friction of the mechanism when the terminal pivots are on a level or in a horizontal plane, as in Fig. 14; but in practice said poising-point is so far below said horizontal plane as to make the difference in the effective radii of said parts equal to the said frictional resistance. This feature, however, is open to some practical objection, being deemed by some to be more sensitive and more liable to variation on account of vibration of buildings in which the machines may be used. By means of my improvements, however, all such objections are largely overcome, since the beam-actuating arm may be set so as to become effective at once on the arrival of the beam at its true or theoretical poising-point, which is shown in Fig. 14; but in practice the beam is allowed to pass slightly below its true poising-point before the weight is thrown thereon, and for this reason: When the steam reaches its said true poising-point, (the cut-off valve being on the cam-arm 74,) the grain is still flowing into the bucket, thus furnishing additional weight to the load, and thereby insuring the further movement of the beam. Hence I prefer to so locate said arm 74 in the machine that it shall become effective on the beam at the actual poising-point. (Represented in Fig. 15.) At this point the actuator 78 has passed below the detent-face 77$^a$, and is borne down upon by the cam-face 77$^b$ of the weighted arm 174, (corresponding to valve-arm 74.)

The downward movement of the beam comprises three periods: first, of the reduction of the column; second, of the poising of the scale-beam, (shown in Fig. 14,) and, third, of the discharge of the load. (Shown in Fig. 16.) The first period begins and ends with the closing movement of the reducing-valve. The second begins when the beam-arm leaves the reducing-valve lever and ends when the cut-off valve begins to close. The third is the period of cut-off-valve closure, during which the bucket-latches are unhooked and the load begins discharging.

At the poising position and when the bucket is fully loaded the beam is exactly balanced, so that it has no moving tendency of its own. Besides there is a small but very material resistance, due to the friction of the pivots, which must be overcome before any extraneous force can continue the beam movement. At a certain point below said poising-point (the beam being of the said overpoise type) the effective radius 103 becomes so much in excess of the effective radius 104 that the loaded bucket will more than equal in effect the counter-weight, so that the beam now has a self-moving tendency and a power sufficient to continue its movement, and also to unhook the latch 42, or complete the unhooking thereof if the same has been previously begun. The space intervening between said poising and self-moving points I denominate the "subpoise" period, this being that portion of its stroke wherein the loaded beam is practically non-self-moving, and which is shown approximately by the angle 110 in Fig. 14. To furnish effective means for actuating the beam during this period is one of the more important objects of my present improvements.

It will be observed that in the drawings the cam 77 on the arm of the cut-off valve has a detent-face 77$^a$, and below said detent-face has a cam-face 77$^b$, which is set or formed at a comparatively slight angle to the radial line 105 from this cam to the beam-axis. During the first period of the process of loading the bucket, during which period the reducing-valve is closed, and also during the poising period, the valve-actuator 78, which is carried by the beam, rests against the said detent-face 77ª; but when the poising period terminates the said actuator 78, or the angle 78ª thereof, falls below the detent-face, so that said cam-face 77ᵇ bears directly and downwardly on the said part 78 of the beam, and thus overpoises the beam to throw down the same, and thereby discharge the load. This latter position is shown in Fig. 16, where the beam is down, the valves being both closed. The angle of the cam-face 77ᵇ relative to the radial line 105 should be such that on the discharge of the grain the main weight W suffices to readily open the valve again, and such as to secure a comparatively sudden closure of the cut-off valve when the beam descends subsequently to the poising thereof. By making said cam-face substantially as shown, so that the angle thereof relative to said line is an acute one of less than forty-five degrees, the falling weight of the valve is thrown on the beam with a multiplied effect, thereby greatly increasing the effectiveness of its aforesaid action on and through the beam to discharge the load.

During the poising period it is important that the slight pressure of the cut-off valve (meaning by this expression the weight or pressure of this valve and its accessory parts, including the arms and weight thereon) on or against the beam (or against some part, as the actuator 78, on the beam) shall be so neutralized as not to act for the movement thereof. To this end the detent-surface 77ª of the cut-off-valve arm 74 is made or arranged to stand during the poising substantially parallel to the line of movement at that point of the valve-actuator which bears on said surface. By means of this construction the said actuator during said poising period is not effective either to open or to close the valve, and the pressure on said actuator being thus brought radial to the beam axis is neutralized and rendered of no moving effect on the beam. This feature will be understood from said views Figs. 14, 15, and 16, wherein 105 designates said radial line and 106 the line of the beam movement, this being in a direction crosswise to the movement of the cam 77.

For regulating the discharge of grain by the machine, I provide a seperate regulator-valve 80, which is or may be suspended by arms 82 84 from said pivots 61 63, or from some point adjacent thereto. This valve is actuated by connections from the regulator P, hereinbefore described, but which may be any device operated by the accumulation of the discharged grain. These connections may consist of the rod 85, angle-lever 86, and rod 87, connected at 88 to the valve 80. When the grain accumulates sufficiently in said regulator to lift weights 11, the said connections close the valve 80 from its position in Figs. 4 and 5 to that in Fig. 7. This cuts off the grain by the aid of valve 60, whether or not the valve 70 remains open, and thus suspends the operation of the machine. On the rising of the regulator the valve 80 is drawn back, as in Figs. 4, 5, and 6, and (the supply-chute being full) the machine is started again.

One feature of my improvements is not shown in the general views, owing to the small scale on which the same are drawn, but is shown on a larger scale in Figs. 10 and 11. Here the valve 60 is shown inclined, or set eccentric to its line of movement, the edge being on a longer radius than the "heel" or outer edge 92 thereof. By this means the space at 95 between the valve and chute 63 constantly increases as the valve is moved toward the left hand. On the opposite movement toward the right hand the downwardly-inclined upper surface 96 tends to carry the grains 98 at said place 95 also toward the right, and thus to prevent clogging, which has heretofore been one of the serious obstacles to the proper working of this class of grain-scales. In Fig. 11 the inclined surface 96 is formed in steps divided by the edges 99, which edges serve to carry back the grain with greater certainty. The upper surface of said valve is concave and is substantially of the nature of a spiral which has the valve-shaft axis as its point of origin. This construction is found in practice to serve said purpose very effectively.

It is not essential to my improved machine that both of the valves 60 and 70 shall be actuated by the particular cams hereinbefore described therefor.

In Figs. 8 and 9 I have shown a modified arrangement for actuating the valve 60. According to this plan the valve-cam is a curved arm 100, which is actuated by an arm 102 on the beam-arm 21. The operation thereof will be obvious from comparison of Figs. 8 and 9. This improvement (shown as a modification herein) constitutes, in part, the subject-matter of a separate application, Serial No. 338,818, filed June 31, 1890, wherein the particular mode of operation and the advantages thereof are more fully set forth.

By the term "falling weight," as used herein in connection with a valve, I refer to that portion of the actual or avoirdupois weight which is not sustained at any given moment by the valve-supporting pivots or bearings. For instance, when the cut-off valve is open or partly open it is not wholly supported on its aforesaid pivots, but is partly upheld by the actuator 78 bearing against the valve-arm 74.

Having thus described my invention, I claim—

1. In a grain-weigher, the combination, with the supply-chute, the scale-beam, and the regulator, of the reducing-valve and the cut-off valve, both actuated by the said beam and arranged to close and meet under said chute from opposite sides thereof, and the regulator-valve located between the cut-off valve and chute and actuated by said regulator, all substantially as described.

2. In a grain-weigher, the combination of the oscillating grain-bucket supported by swinging hangers, substantially as described, the stop-catches on said bucket, the latch pivoted at one end to said hangers and having detent-catches engaging with the stop-catches, and abutments operating said latch to disengage said catches, one abutment being set to act when the bucket is in its forward and the other when in its backward position, substantially as described.

3. In a grain-weigher, the combination of the oscillating bucket supported in the swinging hangers, catch 40, fixed on said bucket, latch 42, pivoted at 43 to the hanger and having catch 41 and the projecting end 45, and two abutments 46 and 48, set to correspond with the two positions of the buckets, respectively, all substantially as shown and described.

4. In a grain-weigher, the combination, with the supply-chute, of the swinging cut-off valve laterally movable thereunder and having its concave upper surface of an increasing radius from the back toward the forward edge thereof, substantially as described.

5. In a grain-weigher, the combination, with the supply-chute, of the cut-off valve laterally movable thereunder and having its upper surface downwardly pitched in successive steps, substantially as described.

6. In a grain-weigher, the combination, with the scale-beam, of the actuator on said beam and a beam-actuating arm having two faces, of which one said face is substantially neutral and the other effective in respect of the beam movement, said arm being located in the machine to bear its said neutral face against said actuator during the poising and to bear its said effective face against said actuator subsequent to the poising, all substantially as described.

7. In a grain-weigher, the combination, with the scale-beam, of the actuator on said beam and the pivotally-supported weight-actuated arm having two faces, of which one said face is neutral and the other effective in respect of the beam movement, said arm being located in the machine to bear its said neutral face against said actuator during the poising and to bear its said effective face against said actuator subsequent to the poising, all substantially as described.

8. In a grain-weigher, the combination, with the scale-beam, the hangers, the oscillating bucket supported by said hangers and having catches thereon, and with the bucket-locking latch, of the stop or abutment set to unhook the latch at a given point in the downward movement of the bucket, and a beam-actuating arm, substantially as described, located in the machine, to be effective on said beam subsequent to the poising and prior to the unhooking of said latch, whereby power for said unhooking is derived from said arm, all substantially as described.

9. In a grain-weigher, the combination, with the scale-beam of the overpoise type, with the bucket suspended from said beam, and having catches and a bucket-locking latch, and with a stop or abutment set to actuate said latch, of a beam-actuating arm, substantially as described, located in the machine, to become effective on the beam at the poising position of the downwardly-moving beam, whereby the beam is operated by said arm during the sub-poising period of its movement, all substantially as described.

10. In a grain-weigher, the combination, with the supply-chute, the scale-beam, and the reducing and cut-off valves, of means, substantially as described, operating the reducing valve from the beam, an arm on the cut-off valve having a detent-face crosswise to a radial line from said face to the beam-axis and having a cam-face below said detent-face, and a valve-actuator carried by the beam and arranged to bear against said detent-face during the poising of the beam, whereby the cut-off valve is detained from closing during the closing of the reducing-valve and during the poising, and whereby the falling weight of the valve is thrown upon the beam subsequent to the poising, substantially as described.

11. In a grain-weigher, the combination, with the supply-chute, the scale-beam, and the reducing and cut-off valves, of means, substantially as described, operating the reducing-valve from the beam, an arm on the cut-off valve having a detent-face crosswise to a radial line from said face to the beam-axis and having below said detent-face a cam-face inclined at an acute angle of less than forty-five degrees from said radial line, and a valve-actuator carried by the beam and arranged to bear against said detent-face during the poising and to pass under said inclined face subsequent to the poising, whereby the falling weight of the cut-off valve subsequently to the poising is thrown upon the beam with multiplied effect, substantially as described.

CHARLES H. COOLEY.

Witnesses:
W. M. BYORKMAN,
HENRY L. RECKARD.